UNITED STATES PATENT OFFICE 2,362,291

LUBRICANT

Carl Winning, Union, N. J., assignor to Standard Oil Development Company, a corporation of Delaware No Drawing. Application December 30, 1939,
Serial No. 311,835

17 Claims. (Cl. 252—48)

This invention relates to a novel type of metal compound and methods of preparing the same, and relates more particularly to the use of these novel compounds as addition agents in hydrocarbon compositions, especially lubricating oils, for improving same.

It has been found that hydrocarbon compositions, especially hydrocarbon lubricating oils, are greatly improved by adding thereto a small amount of metal compound such as a barium salt of diisobutyl phenol thioether, which might also be called a sulfide of barium tert-octyl phenolate. It is believed to have the formula shown in its simplest form as:

where $n$ is one, or more. If the various groups attached to the aromatic nucleus are so positioned that the tert-octyl group is in an ortho position to the oxygen, and the sulfur linkage is in a meta position to the oxygen, this compound, although it might have other possibilities, probably has the following basic formula:

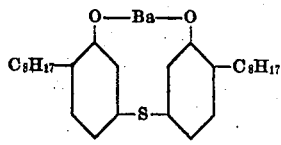

It should be understood that the position of the various substituents around the aromatic nucleus may be varied without departing from the scope of the invention. Furthermore, since both the barium and the organic molecule are divalent, it is apparent that, in combination, these agents may build up quite large molecules.

A similar disulfide compound may be used in which the group —S— in the above graphic formula is replaced by the group

or if preferred by the group —S—S—, or even higher polysulfides may be used.

These various compounds can be produced by preparing the corresponding alkyl phenol sulfides or disulfides, which per se are known, and converting these directly into the barium salts thereof, as by heating with barium hydroxide in a suitable diluent.

The invention may be described more broadly as comprising a substituted phenolate compound of barium containing at least one grouping having the general formula:

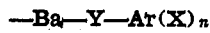

wherein Y is an element in the right hand side of group 6 of the periodic table (Mendeleeff), Ar is an aromatic nucleus which contains like or unlike substituents, X, $n$ in number, replacing nuclear hydrogen, $n$ being at least one.

The substituents, X, may be organic, inorganic, or both. For example, they may be alkyl radicals or groups containing one or more of the non-metallic elements belonging to groups V, VI, and VII of the periodic system (Mendeleeff): nitrogen, phosphorus, oxygen, sulfur, and halogens, as in amino, nitro, phosphite, phosphate, hydroxy, alkoxy, sulfide, thioether, mercapto, chloro groups, and the like, or they may be organic radicals containing one or more of the inorganic groups.

In the phenolate salts constituting blending agents featured by this invention, if only one of the valences of the barium is connected to a substituted phenolic radical, such as —O—Ar(X)$_n$, the other should be connected to other organic groups or to inorganic constituents. For convenience, non-phenolic radicals or groups, as well as phenolic groups, attached to the metal are indicated broadly by R in the following types of compositional formulae, which broadly represent barium derivatives of substituted phenolic compounds containing the characteristic compositional grouping described:

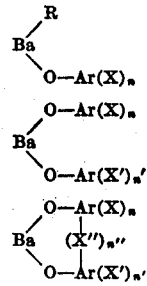

Where oxygen is shown in these formulae it may be replaced by sulfur, selenium or tellurium, as in the case of thiophenolic compounds.

More specifically, some of the structures which the substituted phenolates may have are indicated in the following list of formulas containing benzene nuclei of compositions —C₆H₄—, —C₆H₃—, etc., with X, as before, standing for nuclear substituents (e. g., —C$_n$H$_{2n+1}$, —NO₂, —Cl, —S—, —S₂—, —NH₂, —NH(C$_n$H$_{2n+1}$), etc.):

R—Ba(OC₆H₄X)
Ba(—O—C₆H₄—X)₂
Ba[—O—(X)C₆H₃—]₂X'
Ba(—O—C₆H₄—)₂X
Ba(—O—C₆H₃(X)—X'$_n$—C₆H₃(X")—OH)₂
Ba[—O—(X)C₆H₃—]₂X'$_n$
Ba[—O—(X)C₆H₃—]₂X'=X"

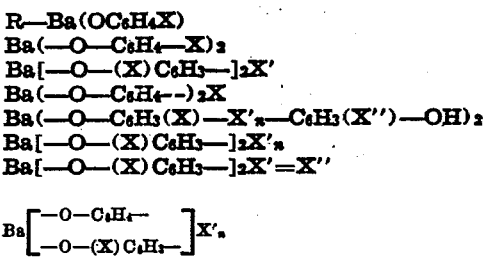

Corresponding barium derivatives of the following illustrative types of substituted phenolic compounds are among those that can be used, in which R represents an alkyl group, preferably having at least 4 carbon atoms:

*Group A*

HO—C₆H₄R
HO—C₆H₃(R)R'
HO—C₆H₂(R)(R')R"
HO—(R)C₆H₃—O—C₆H₃(R)—OH
[HO—(R)C₆H₃O]₃P
HO—(R)C₆H₃—O—CH₂—C₆H₄—OH
HO—(R)C₆H₃—CH₂—O—C₆H₃(R')—OH
HO—(R)C₆H₃—P(OH)—C₆H₃(R)—OH
HO—(R)C₆H₃—CH₂NH—C₆H₃(R)—OH
HO—(R)C₆H₃—CH(Cl)—CH₂—C₆H₃(R)—OH

All these compounds when employed in high temperature lubrication service tend to corrode such sensitive engine parts as copper-lead and cadmium-silver bearings. This characteristic can usually be corrected by including, in the lubricating composition, suitable anti-oxidants or other anti-corrosion agents, e. g. benzyl para-amino phenol, alpha naphthol, tertiary amyl phenol sulfide, triphenyl phosphite, dibutyl amine, etc. It may be mentioned that metallic soaps of carboxylic acids are considerably more corrosive than the phenolic salts of this invention and that their corrosiveness is less amenable to correction by the use of anti-oxidants, etc.

However, this corrosion problem can also be at least partially and in most cases completely taken care of by chemically incorporating an element of the sulfur family (i. e. S, Se, and Te), preferably sulfur, into the structure of the substituted phenolate salts of barium, thus making unnecessary the addition of any separate anti-corrosion agent. Thus the barium derivatives of the following illustrative types of substituted phenolic compounds are preferred over those listed in Group A above.

*Group B*

HO—(R)C₆H₃—S—C₆H₃(R)—OH
HO—(R)C₆H₃—S—S—C₆H₃(R)—OH
HO—(R)C₆H₃—S(=S)—C₆H₃(R)—OH

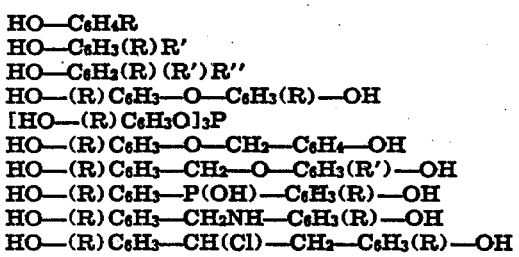

HO—(R)C₆H₃—S—C₄H₉
(may be branched or straight chain)
HO—(R)C₆H₃—S—CH₂—C₆H₅
HO—(R)C₆H₃—CH₂—S—CH₂—C₆H₃(R)—OH
HO—(R)C₆H₃—S—CH₂—C₆H₃(R)—OH HO—(R)C₆H₃—S—(C$_n$H$_{2n}$)—OH
HO—(R)C₆H₃—S—C₆H₃(R)—(C$_n$H$_{2n}$)—OH
HO—(OR)C₆H₃—S—C₆H₃(OR)—OH
HO—(OR)C₆H₃—S—C₆H₂(R')(OR)—OH
HO—(R)(NH₂)C₆H₂—S—C₆H₂(NH₂)(R)—OH
HO—(R)(OH)C₆H₂—S—C₆H₂(OH)(R)—OH
HS—(R)C₆H₃—S—C₆H₃(R)—OH

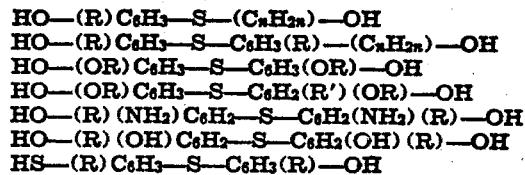

HO—(R)C₆H₃—S—C₆H₃(R)—OR
HO—(R)C₆H₃—S—C₆H₄—R
HO—(R)C₆H₃—S—(C$_n$H$_{2n}$)—NH₂
HO—(R)C₆H₃—S—C₆H₃(R')—R"
HO—(R)(COR)C₆H₂—S—C₆H₂(R)(COR)—OH
[HO—(R)C₆H₃—S—C₆H₃(R)O]₃P
[HO—(R)C₆H₃—S—C₆H₃(R)O]₃PO

These preferred phenolates may also contain sulfur in other positions or groups at the same time as in the places shown in the formulas in Group B. Furthermore, the formulas in Group A may have sulfur incorporated therein. More broadly it may be stated that inorganic substituents, particularly negative inorganic groups containing non-metallic elements of groups V, VI, and VII of the Mendeleeff Periodic System, beneficially influence the phenolates by increasing their potency for stabilizing the lubricating oils and by making the phenolates, in themselves, more stable, as for instance, against hydrolysis.

Especially preferred, because they are both very efficient and also lend themselves to easy and economical manufacture, are compounds containing at least one grouping having the general formula:

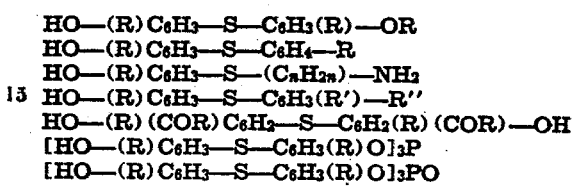

where Ar is an aromatic nucleus, R is an organic group, Z is a member of the sulfur family, and $n$ is an integer of 1 to 5. Z is preferably sulfur, and $n$ is preferably 1 or 2. R represents an organic group which may be either aryl, alkyl, alkaryl, aralkyl or cycloalkyl, and which may contain substituent groups such as halogen, particularly chlorine, nitro, nitroso, amino, hydroxy, carboxy, alkoxy, aroxy, mercapto, and the like, but R preferably is or contains an alkyl or alkylenyl group, and preferably contains at least 4 carbon atoms but may contain many more, such as 8, 10, 16, 18, etc.

The configurations of the compounds are not limited to certain positions for the substituent groups, for these may be in ortho, para, or meta relations to one another. Also, the substituents, X, in broader formulae discussed previously in any aromatic nucleus may be alike or different.

The aromatic nucleus may be polycyclic as in naphthalene, phenanthrene, diphenyl, etc. Where oxygen occurs, it may be replaced by sulfur, selenium, or tellurium, as in the case of thiophenolic compounds.

An important feature of this invention issues from the observation that metal phenolates are benefited in solubility and effectiveness as hydrocarbon lubricating oil blending agents when they contain a total of at least 8 and preferably 10 or more carbon atoms per molecule in aliphatic groupings, when sulfur is present in the molecule, and at least 16 carbon atoms and preferably 18 or more, if no sulfur is present.

Specific examples of preferred substituted phenolates falling into the classes mentioned, having at least one alkyl radical as a substituent are formulated as follows:

I. Alkyl phenolates $$Ba(O-C_6H_4-C_nH_{2n+1})_2$$
$$Ba[O-C_6H_3(C_nH_{2n+1})_2]_2$$

e. g. salts of tert-octyl phenol
salts of octadecyl phenol
salts of di(tert.) amyl phenol II. Alkyl chlorphenolates $$Ba(O-C_6H_3Cl-C_nH_{2n+1})_2$$
$$Ba(O-C_6H_2Cl_2-C_nH_{2n+1})_2$$
$$Ba[O-C_6H_2Cl(C_nH_{2n+1})_2]_2$$

e. g. salts of 2 chloro, 4 octadecyl phenol
salts of 2,6 dichloro, 4 tert-octyl phenol
salts of 6 chloro,2,4 di(tert.) amyl phenol III. Alkyl amino phenolates $$Ba\{OC_6H_3[CH_2N(C_2H_y)_2](C_nH_{2n+1})\}_2$$

e. g. salts of dicyclohexyl amino methyl tert-octyl phenol

IV. Thioethers of alkyl phenolates $$Ba[O-C_6H_3(C_nH_{2n+1})]_2S$$
$$Ba[O-C_6H_2(C_nH_{2n+1})_2]_2S$$

e. g. thioether of salts of tert-octyl phenol
thioether of salts of tertiary amyl cresol V. Disulfides of alkyl phenolates $$Ba[O-C_6H_3-C_nH_{2n+1}]_2S_2$$

e. g. salts of tert. amyl phenol disulfide

VI. Phosphorous acid esters of alkyl phenol sulfides $$Ba_3[O-C_6H_3(C_nH_{2n+1})S(C_nH_{2n+1})-C_6H_3-O]_6P_2$$

e. g. salts of tert. amyl phenol sulfide monophosphite

As these substituted phenolates are generally made by reacting the corresponding phenols with barium hydroxide, the amount of metal in the final phenolate product will depend on proportions of reactants used, and since products having different proportions are possible, the product will usually consist of a mixture, which may be used as such or be separated into its several constituents.

As suggested above, the barium compounds of this invention preferably have the general formula:

$$Ba[-O-Ar(R)]_2S_x$$

where $x$ is 1 or 2, R represents one or more alkyl groups, having enough carbon atoms, preferably a total in the molecule of at least 10, to insure solubility of the compounds in mineral oil. More particularly still, compounds having the following general formula are preferred:

$$Ba[-OC_6H_3(R)]_2S$$

For the objects stated, the barium phenolates have been preferably prepared from phenolic compounds readily obtainable by synthetic alkylation of the simple phenols and cresols or by extraction from high boiling petroleum oils.

Suitable synthetic alkyl phenols for preparing the desired phenolates are principally of the secondary and tertiary types, because alkylation of a simple phenol occurs more readily with branched aliphatic reactants. Commonly, the alkylation reaction involves a condensation of olefins with the simple phenols, the reaction being catalyzed by anhydrous metal halides, sulfuric acid, phosphoric acid, or certain activated clays. As olefinic reactants, refinery gases containing propylene, butylenes, amylenes, etc., are economically useful, although individual olefins, e. g., isobutylene, iso-amylene, diisobutylene, triisobutylene, etc., or olefin-containing mixtures from other sources may be used. The reaction temperature is usually controlled to avoid side reactions. In employing sulfuric acid, a liquid phase reaction at relatively low temperatures is preferred; with phosphoric acid the reaction may be carried out in the vapor phase.

As starting materials for conversion into barium phenolates, the phenols may contain one or more substituents which provide a desired number of carbon atoms in groups having the form of straight chains, branched chains, or even rings. Mono-alkyl or poly-alkyl phenols are synthesized conveniently by alkylating a phenol with branched chain olefin polymers, such as diisobutylene, triisobutylene, di-tert.-amylene, or other suitable agents, such as alcohols, alkyl sulfates, alkyl phosphates, or alkyl halides, thereby forming carbon-to-carbon bonds between the aromatic nucleus and the alkyl group.

Petroleum phenols which qualify for the present purpose are considered to contain polymethylene or cycloalkyl side chains, as evidenced by their hydrogen and carbon analysis. The petroleum phenols are obtained by extraction of various stocks, chiefly from cracking process heating oil stocks, with caustic soda, and acidification of the alkaline extract with a weak mineral acid followed by a non-destructive distillation if desired.

By using the described methods or any other well known method for preparing alkyl phenols, the following alkylated phenols may be procured for preparing the phenolates: tert.-amyl phenols, iso-hexyl phenol, tert-octyl phenol, di-tert.-butyl phenol, di-(tert-octyl) phenol, etc.

Inorganic substituents are introduced into alkyl phenols by well known methods. For example, an alkyl phenol, e. g. tert.-amyl phenol, is reacted with sulfur mono-chloride, $S_2Cl_2$, in about a 1:½ mole ratio and preferably in a solvent such as dichlorethane, to produce the alkyl phenol disulfide. Using substantially the same procedure but substituting sulfur dichloride, $SCl_2$, for the mono-chloride, the alkyl phenols are given a thioether linkage substituent. Alkyl chlorphenols are obtained by chlorination, preferably controlled to replace nuclear hydrogen by a chloro group. This may be accomplished by chlorinating the phenol before alkylation. In such a manner, for example, 2-chlor-4-tert.-amyl phenol can be produced. Nitro substituents are introduced readily into the aromatic nucleus by direct nitration, and nitro substituents can be reduced to amino groups. It is to be understood, however, that the preparation of substituted phenolic compounds which have been described does not form part of this invention and that any of the well known methods for their production may be used.

The invention will be better understood from a consideration of the following experimental data:

EXAMPLE 1

*Barium salt of tertiary amyl phenol sulfide*

7.7 grams (⅓ mole) of sodium were reacted with 150 ccs. of absolute methyl alcohol. 60 grams (⅙ mole) of tertiary amyl phenol sulfide in 100 ccs. of absolute methyl alcohol were added. 54.5 grams (49.5 grams=⅛ mole) of anhydrous barium bromide dissolved in 300 ccs. of methyl alcohol were added with agitation. A copious yellow precipitate formed and was filtered off and air-dried. The filtrate was stripped free of methyl alcohol, leaving some more yellow solid. The two solid residues were combined and, after drying, were refluxed with light naphtha. A little naphtha was distilled off to remove some methyl alcohol still present, and then, after partially cooling, the salts were filtered off to leave sodium bromide as a filter residue. The naphtha was stripped from the filtrate, leaving a yield of 75 grams of the barium phenolate, a yellow product which dissolved very readily in naphthenic Diesel oil (viscosity of 55 secs. Saybolt at 210° F.) on heating. The product was found to contain 28.6% of BaO (theoretical 31.1%).

EXAMPLE 2
Barium tertiary octyl phenolate 5.8 grams of sodium (¼ mole) were dissolved in 150 ccs. of dried methyl alcohol. 52 grams (¼ mole) of tert-octyl phenol, dissolved in 100 ccs. of methyl alcohol, were added, followed by 41 grams (37.1 grams=⅛ mole) of anhydrous barium bromide BaBr₂, dissolved in 225 ccs. of methyl alcohol. The methyl alcohol was distilled off and the residue was treated with light naphtha, using heat to accelerate solution. The precipitated sodium bromide was filtered off, then the naphtha was stripped from the filtrate, yielding a product which was not entirely oil-soluble. To refine this product, it was refluxed with more light naphtha, allowed to stand several days, refluxed again, and then filtered free of insoluble materials. When the filtrate was stripped free of naphtha, a yield of 48 grams of a yellow solid was obtained, which dissolved slowly in oil on heating with agitation. This product is barium tert-octyl phenolate having the formula $$Ba(C_8H_{17}-C_6H_4-O)_2$$

This same product was also made by reacting 1 mole (315 grams) of barium hydroxide Ba(OH)₂—8H₂O with a solution of 2 moles (414 grams) of tert-octyl phenol in 3 l. of benzol (100%) giving a 97% yield of barium tert-octyl phenolate analyzing 25.9% BaO (theoretical= 27.9%).

EXAMPLE 3
Barium di-tertiary amyl phenolate

⅕ gram mole (46.8 grams) of ortho para di-tertiary amyl phenol was added to 33 grams (0.1 mole=31.6 grams) of barium hydroxide,

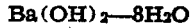

in 300 cc. of absolute ethyl alcohol. The alcohol solution was refluxed for one hour and the alcohol then distilled off. The residue was taken up in benzene and unreacted barium hydroxide filtered off. Benzene was stripped from the filtrate, the last traces being removed under vacuum. The residue was the barium salt of di-tertiary amyl phenol, which may otherwise be called barium di-tertiary amyl phenolate. The yield was practically quantitative and the product was readily soluble in mineral oil, for instance, in a naphthenic Diesel oil having a viscosity of about 55 seconds Saybolt at 210° F.

EXAMPLE 4
Barium tertiary octyl phenol sulfide 442 grams (1 mole) of tert-octyl phenol sulfide (prepared by the reaction of sulfur dichloride with tert-octyl isobutyl phenol) were dissolved in 2316 grams of a 55 viscosity (Saybolt at 210° F.) naphthenic base oil. The solution was agitated and the temperature raised to 225° F. To the agitated solution 331 grams of barium hydroxide, Ba(OH)₂—8H₂O, (the 331 grams of

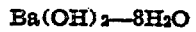

representing 1 mole of the hydroxide + 5% excess, to make allowance for impurities, particularly barium carbonate, in the hydroxide) were added gradually over a period of one and one-half hours, the rate of addition being governed by the rate of removal of water from the system. Towards the end of the reaction, considerable foaming of the mixture occurred and the temperature was therefore raised to 275° F.–300° F. The product was stirred for an additional 15 minute period at 300° F., after complete removal of the water had been effected. The resulting 20% blend of barium tert-octyl phenol sulfide, a rather viscous light reddish-colored oil, was filtered through paper, using a filter aid. The filtering step was employed to remove small amounts of barium carbonate and unreacted barium oxide. The barium phenolates were thus obtained in oil solution in a form convenient for dilution to working strength.

Corresponding barium salts of other alkyl phenol sulfides may be prepared; for instance, by substituting polysulfides or polymers such as the dimers, trimers, and tetramers, of the alkyl phenol thioethers, disulfides, and the like, in place of the alkyl phenol thioethers used in the above examples. Also, the barium salts of the corresponding selenides and tellurides may be prepared, although the sulfur compounds are preferred.

The various products obtained may be purified, if desired, by fractional crystallization, extraction, precipitation with selective solvents, etc. Also, impurities may be removed by treatment with suitable adsorptive agents such as clay.

While these compounds or mixtures thereof, alone or in admixture with corresponding alkyl phenol sulfides, may be added in any desired concentration within their solubility limits to lubricating oils, they are preferably used in concentrations of about 0.01 to 2.0%, about 0.1 to 1.0% being generally sufficient to impart sludging-resistant and other valuable properties, as will be pointed out later, to the majority of lubricating oils. Larger amounts up to 5% or more may be used to improve the lubricating or oiliness characteristics of the lubricating oils.

These barium compounds may also be used as improving agents in other hydrocarbon oils or products, such as waxes, fuel oils, Diesel fuels, naphthas, gasoline, burning oil, and the like.

These metal compounds may also be used as improving agents in products derived from petroleum oils or in different types of products such as fatty oils, soaps, aldehydes, resins, rubber, paper, and various synthetic products which tend to deteriorate by oxidation either alone or in accompaniment with other chemical phenomena.

The barium compounds of this invention are especially useful for improving mineral lubricating oils, particularly those used for crankcase lubrication of internal combustion engines, the most important of all being Diesel engine lubricants, because the operating conditions met by these oils are so different and so severe that oils which are rated as high grade lubricating oils for ordinary automobile engines deteriorate very rapidly in Diesel engines and necessitate frequent overhauling. The lubricating oil base stock to which these barium compounds are to be added may be obtained from various types of crudes such as paraffinic, naphthenic, asphaltic, or mixed crudes, and they may be either plain distillates or fractions obtained by treating or refining by various methods known to the art, such as acid treating, clay treating, solvent extraction, dewaxing, etc., or they may be synthetic oils resulting from various types of chemical reactions, such as cracking, polymerization, condensation, and the like.

In preparing finished lubricants according to this invention, other known addition agents may be included in the composition, such as dyes, soaps, pour inhibitors, sludge dispersers, oxidation inhibitors, mutual solvents, etc. Furthermore, although the invention is of primary importance for preparing Diesel engine lubricants, it is also useful for the manufacture of other types of crankcase lubricants, steam cylinder oils, greases, upper cylinder lubricants, slushing oils, etc.

This invention has many advantages, some of which are apparent from the preceding discussions, others being now pointed out. One of the most important features of this invention is that when these barium compounds are used as improving agents in Diesel engine lubricants, the engines lubricated are kept remarkably clean in spite of the fact that when conventional lubricants are employed, Diesel engines are particularly liable to sludging, lacquering and ring sticking difficulties. The effect shows up particularly clearly in the condition of the oil filter which, during operation on conventional oils, often chokes up rapidly. However, when lubrication is effected with an oil containing these new barium compounds, the filter remains very clean. It is thought that the barium compounds so modify the deterioration of the oil that the formation of deposit-forming products is either largely prevented or that these are kept dispersed in the oil so effectively that they cannot deposit out. The beneficial action is seemingly not one involving the prevention of oxidation, since the preferred agents are considerably more efficient in keeping the engine clean that many other substances which have at least as good, if not superior, anti-oxidant properties. The barium compounds of this invention also have an advantage of preventing engine wear. In some instances, mixtures of different barium compounds falling within the scope of this invention may be used to particular advantage, as, for example, a mixture of barium phenolate with barium phenolate thioether or other sulfides.

These and other advantages of the invention will be still better understood from an examination of the following engine test data.

EXAMPLE 5

0.25% blends were made of the barium salt of tertiary amyl phenol sulfide (prepared as described in Example 1) in two fractions (differing chiefly in viscosity and boiling range) of a paraffin-rich lubricating oil base stock, prepared by phenol extraction of a Mid-Continent crude. One fraction was an S. A. E. 20 and the other fraction an S. A. E. 40. The lighter one (S. A. E. 20) was submitted to an oxidation rate test, which comprises bubbling oxygen through a 10 gm. sample of the oil at 392° F. at a rate of 700 cc. per minute and determining the amount of oxygen (measured in cubic centimeters) absorbed in successive 15 minute intervals. For comparison, a blank test was also run on the plain oil not containing any of the barium salt. The S. A. E. 40 blend containing the barium salt, and also a blank sample of the plain oil not containing any of the barium salt, was subjected to a test in the C. F. R. (Cooperative Fuel Research) engine for 15 hours at 390° F. jacket temperature. At the end of the run, the engine was taken down, inspected, and rated by demerit (the lower the better) according to the condition of the piston parts, valves and cylinders. The demerit rating of the blank oil is represented as 100 and the reference rating of the blend is expressed as "percent of reference" and is calculated as follows:

$$\text{Percent of reference} = \frac{\text{blend demerit} \times 100}{\text{blank oil demerit}}$$

The lower the "percent of reference," the better the oil according to this engine test. The results of these tests are tabulated as follows:

| S. A. E. | Test | Blank | Blend |
|---|---|---|---|
| 20 | Oxidation rate | 74 | 12 |
| | | 40 | 52 |
| | | 35 | 18 |
| | | 29 | 14 |
| | Average | 44 | 24 |
| 40 | C. F. R. engine demerits (the lower, the better) percent of reference | 100 | 10 |
| | Piston overall demerit | 3.51 | 0.43 |
| | Rings stuck | 2 | 0 |
| | Carbon formed | 4.2 | 1.10 |

The above tests indicate that the addition of 0.25% of the barium salt of tertiary amyl phenol sulfide to the lubricating oil base stock very substantially reduced the oxidation rate of the latter (from 44 down to 24) and greatly lowered the C. F. R. engine demerit rating (from 100% down to 10%). These results are particularly interesting in view of the fact that in other similar tests the addition of an equal amount of the corresponding calcium compound to the same lubricating oil base stock resulted in an oxidation rate substantially the same as that of the barium salt, namely, 25 as compared to 24, but the barium salt was definitely superior in the C. F. R. engine demerit rating, giving a "percent of reference" of 10 compared to 17 for the corresponding calcium salt. Secondly, this important improvement in engine performance is not necessarily directly or indirectly proportional to the oxidation rate, as shown by comparison with the performance of the calcium, and perhaps may not even have any relation to such oxidation rate. Since the oxidation rate test is a direct measure of anti-oxidant effectiveness, it appears that the improvement in engine condition is, at least in part, the result of phenomena not involving the retardation of oxidation and that the benefits secured, consequently, are not merely those obtainable with conventional anti-oxidants.

A more careful examination of the above test results under the C. F. R. engine tests indicates that the barium salt blend had a piston overall demerit of only 0.43 compared to 3.51 for the plain oil and that in the test run with the barium salt, no rings were stuck, whereas with the plain oil two rings were stuck, and finally in the test run with the barium salt blend only 1.10 grams of carbon were formed compared to 4.2 for the plain oil. These results show that the barium salt caused a very remarkable improvement in the lubricating oil base stock in many different respects.

EXAMPLE 6

A 0.5% blend was made of the barium salt of tertiary amyl phenol sulfide in a naphthenic lubricating oil base stock, S. A. E. 30, referred to hereinafter as naphthenic oil "A," and this blend, together with a sample the plain oil, was subjected to service tests in a Caterpillar Diesel engine, the engine being taken down and examined carefully in several different check-ups during the tests, first at about 110 hours and secondly at about 250 hours. The results of this test are tabulated as follows, where of course the lower the demerit rating figures the better.

*Caterpillar Diesel engine tests*

| Demerit rating (the lower, the better) | 1st check up | | 2nd check up | |
|---|---|---|---|---|
| | Blank | Blend | Blank | Blend |
| Hours | 110 | 112 | 242 | 265 |
| Overall piston demerit | 1.45 | 0.89 | 1.96 | 1.46 |
| Ring cleanliness (S. G. L. S.)[1] | 1.86 | 1.27 | 2.58 | 2.15 |
| Skirt and liner | 2.17 | 0.63 | 2.92 | 1.58 |
| Varnish on skirt | 1.5 | 0.6 | 2.0 | 1.0 |
| Oil filter | 2.0 | 0.25 | 4.0 | 1.5 |
| Oil economy (brake H. P. hrs./gal.) (the higher, the better) | 2,300 | 1,960 | 3,980 | 4,760 |

[1] Slits, grooves, lands and sides.

The above results show that the overall piston demerit in the first check-up was only 0.89 for the blend containing the barium salt, compared to 1.45 for the blank oil, and in the second check up the blend was only 1.46 compared to 1.96 for the blank oil. This shows an unquestionable superiority due to the presence of the barium salt of the tertiary amyl phenol sulfide. It will also be noticed that the superiority of the barium salt blend compared to the blank oil shows up particularly in the oil filter demerit rating, where in the first check up the blend had a demerit of only 0.25 compared to 2.0 for the blank oil, and in the second check up the blend demerit was only 1.5 compared to 4.0 for the blank oil.

The above test results also show that the barium salt also effected a very substantial superiority in oil economy at the end of the second check up, based on the oil consumed during the entire test up to that time. As would appear from these results, the longer the tests are run the greater would be the relative superiority of the barium salt blend compared to the blank oil.

Thus it is apparent that the addition of a small amount of barium tertiary amyl phenol sulfide has decided advantages in the case of lubricating oils used for Caterpillar Diesel engines.

EXAMPLE 7

A 0.25% blend was made of barium salt of tertiary amyl phenol sulfide in an extracted paraffinic oil referred to as "Oil B" and this blend, together with a sample of the blank oil for comparison, were subjected to crankcase lubrication tests in a Chevrolet automobile engine for twenty hours, the engine being taken down at the end of each run, examined carefully and the condition of the various parts rated by demerit. The results of these tests were as follows:

*20-hour Chevrolet engine tests*

| Oil | Oil (blank) (extracted paraffinic oil) | Oil B+0.25% barium salt |
|---|---|---|
| Engine demerits: | | |
| Overall demerit | 1.68 | 0.89 |
| Combustion chamber | 3.33 | 3.10 |
| Sludge | 0.79 | 0.19 |
| Valves | 1.70 | 1.31 |
| Piston skirts | 3.00 | 1.12 |
| Crankshaft deposits | 4.00 | 0.00 |
| Rings and grooves | 1.50 | 1.03 |

These results show that the barium salt blend has an overall demerit of only 0.89 compared to 1.68 for the blank oil. The improvement due to the addition of the barium salt is particularly remarkable in case of the demerit pertaining to the sludge and to the crank shaft, in the latter case the blend having a demerit of 0 compared to 4.0 for the blank oil.

The used oils from these tests were analyzed for sludge, with the following results:

| | Oil B (blank) | Blend |
|---|---|---|
| Naphtha insol. sludge (mg./10 gr.) | 346.3 | 145.5 |
| Chloroform insol. sludge (mg./10 gr.) | 309.6 | 111.2 |

These data indicate that the barium salt of the tertiary amyl phenol sulfide cut down to almost ⅓ the amount of both naphtha insoluble sludge and chloroform insoluble sludge produced by the plain oil.

It should be noticed that the above series of tests in the Chevrolet engine were purposely run under very severe operating conditions as follows:

| | |
|---|---|
| R. P. M. | 3200 |
| Brake H. P. | 59.7 |
| Crankcase temperature °F. | 291 |
| Exhaust gas temperature °F. | 1402 |

Consequently it is evident that the barium salt of the tertiary amyl phenol sulfide is of great value for improving the engine performance of a lubricating oil when subjected to severe operating conditions.

EXAMPLE 8

A 1% blend of the same barium salt of tertiary amyl phenol sulfide in naphthenic oil A was subjected to a copper-lead bearing corrosion test in a high temperature Caterpillar engine for 60 hours, with a bearing temperature of 210° F. and an oil temperature of 195–210° F., a check run being made on the plain naphthenic oil A. The results of these tests were as follows:

| Oil | Naphthenic oil A | Oil A+1% barium salt |
|---|---|---|
| Engine demerits: Heat groove | 3.0 | 2.0 |
| Ring grooves and sides: | | |
| No. 1 and No. 2 | 22.0 | 16.0 |
| No. 4 and No. 5 | 15.0 | 13.0 |
| Piston skirt | 2.00 | 0.75 |
| Oil filter | 3.0 | 2.0 |
| Bearing weight loss [1] | 0.017 | 0.008 |

[1] (Gm. weight loss from copper-lead connecting rod-bearing weighing approx. 650 grams).

These tests show that the blend containing the barium salt was substantially non-corrosive to the copper-lead bearings. This is a valuable result because most additives which improve the performance of lubricating oil in the Caterpillar engine increase the bearing corrosion, particularly in the case of copper-lead bearings in engines operated at high temperatures.

Inspection of the naphthenic oil A, and oil B alone and together with the addition of a small amount of the barium tertiary amyl phenol sulfide, which were used in the tests reported in Examples 6, 7, and 8 are shown in the following table:

*Inspection record table*

| Type of sample | Naphthenic oil A | Oil A+0.5% barium salt [1] | Oil B | Oil B+0.25% barium salt [1] |
|---|---|---|---|---|
| Gravity °A. P. I. | 22.8 | 21.8 | 32.2 | 32.0 |
| Flash point °F | 405 | 410 | 395 | 400 |
| Saybolt viscosity at 100° F. | 514.0 | 539.6 | 256.1 | 255.9 |
| Saybolt viscosity at 210° F. | 55.7 | 55.9 | 53.6 | 53.7 |
| Viscosity index | 39 | 32 | 126 | 126 |
| Pour point °F | −10 | −5 | −15 | −10 |
| Carbon residue per cent | 0.05 | 0.25 | .02 | .12 |

[1] Salt of tertiary amyl phenol sulfide.

An examination of the above table shows that the addition of the barium salt of tertiary amyl phenol sulfide caused no objectionable changes in the character of the two lubricating oil base stocks to which it was added.

EXAMPLE 9

In as much as most metal compound addition agents incorporated into lubricating oils cause an increase in the bearing corrosion loss as compared to the plain oil, particularly as to alloy bearings, such as copper-lead bearings and cadmium-silver bearings, some corrosion tests were made on a blend consisting of a naphthenic base lubricating oil having a viscosity of about 55 seconds Saybolt at 210° F. (referred to as oil A) containing 0.25% of barium salt of phenol, to determine the extent of the increase in bearing corrosion loss obtained thereby and an additional test on a similar blend containing 0.5% of cyclohexyl amine as a corrosion inhibitor. Another test was made on a blend prepared from a different base stock, oil B, containing 0.25% of the same barium salts, plus 0.5% of di-n-butyl amine as corrosion inhibitor. These corrosion tests were made on the Underwood corrosion apparatus supplied by the Scientific Instrument Company, Detroit, Michigan. The detailed procedure of the test is described in French Patent No. 824,600. The results of these Underwood corrosion tests on the blend described are reported in the following table:

| Oil | Bearing corrosion loss, grams | |
|---|---|---|
| | Copper-lead bearings | Cadmium-silver bearings |
| Oil A+0.25% barium salt | .526 | 1.326 |
| Oil A+0.25% barium salt+0.5% cyclohexyl amine | .089 | .067 |
| Oil B+0.25% barium salt+0.5% di-n-butyl amine | .010 | .001 |

These data indicate that the two corrosion inhibitors tested, namely, the cyclohexyl amine and the di-n-butyl amine, can satisfactorily reduce the bearing corrosion loss of sensitive alloy bearings, such as copper-lead and cadmium-silver bearings, with lubricating oil blends containing a small amount of the barium salts of tert-octyl phenol.

It is thus evident that by incorporating barium salts of the substituted phenolic compounds of the present invention into lubricating oils intended for use as crankcase lubricants, especially for Diesel engines, a very remarkable improvement in engine performance can be obtained and any corrosiveness to alloy bearings can be satisfactorily taken care of by incorporating into the lubricating oil blend a small amount of corrosion inhibitor.

This invention is not to be limited to any of the specific examples presented herein, which were given solely for the purpose of illustration, nor by any theory as to the mechanism of the operation of the invention, but only by the following claims in which it is desired to claim all novelty inherent in the invention as far as the prior art permits.

I claim:

1. A lubricant containing a major amount of a mineral lubricating oil and a minor amount of a compound containing at least one grouping having the general formula:

$$-Ba-O-Ar(R)-Z_n-$$

wherein Ar is an aromatic nucleus, R is an aliphatic hydrocarbon group, Z is a member of the sulfur family and $n$ is an integer of 1 to 5.

2. A lubricant containing a major amount of a mineral lubricating oil and a minor amount of a compound having the general formula:

$$Ba(R-Ar-O-)_2S$$

where Ar is an aromatic nucleus and R is an alkyl group having enough carbon atoms to insure solubility of the compound in mineral lubricating oil, and in which the said sulfur atom is linked directly to the two said nuclei (Ar) and in which the said barium atom is linked directly to the two said oxygen atoms.

3. A lubricant containing a major amount of a mineral lubricating oil and a minor amount of a compound having the general formula:

$$Ba[(C_nH_{2n+1})-C_6H_3-O-]_2S$$

where $n$ is an integer of at least 4 in which the said sulfur atom is linked directly to the said two aryl nuclei ($C_6H_3$) and in which the said barium atom is linked directly to the said oxygen atoms.

4. A lubricant containing a major amount of a mineral lubricating oil and a minor amount of an oil-soluble barium salt of an alkyl phenol sulfide wherein the alkyl radicals contain at least four carbon atoms per radical.

5. A lubricant comprising a major proportion of a mineral lubricating oil and a small amount of a compound containing at least one grouping having the general formula:

$$-Ba-O-AR(R)-Z_n-$$

wherein Ar is an aromatic nucleus, R is an aliphatic hydrocarbon group, Z is a member of the sulfur family and $n$ is an integer of 1 to 5.

6. A lubricant comprising an oil-soluble major proportion of a mineral lubricating oil and a barium salt of an alkyl phenol sulfide the alkyl radicals containing at least four carbon atoms per radical.

7. A lubricant comprising a major proportion of a mineral lubricating oil and about 0.1–5.0% of a compound having the formula:

$$Ba[(C_nH_{2n+1})-C_6H_3-O-]_2S$$

where $n$ is an integer of at least 4 in which the

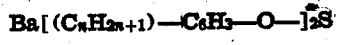

said sulfur atom is linked directly to the said two aryl nuclei (C₆H₃) and in which the said barium atom is linked directly to the said oxygen atoms.

8. A lubricant comprising a mineral oil base stock and a small amount of an oil-soluble barium salt of the reaction product of a sulfur halide with an alkylated aryl compound having a hydroxy group attached directly to the aromatic nucleus.

9. A lubricating-oil composition containing a barium salt of a dialkyl phenol monosulfide having the formula

$n$ being at least 4 in amounts sufficient to exert sludge dispersing properties under heavy duty service in which the said sulfur atom is linked directly to the said two aryl nuclei (C₆H₃) and in which the said barium atom is linked directly to the said oxygen atoms.

10. A paraffin base lubricating oil composition containing a barium salt of a dialkyl phenol monosulfide having the formula

$n$ being at least 4 in amounts sufficient to exert sludge dispersing properties under heavy duty service in which the said sulfur atom is linked directly to the said two aryl nuclei (C₆H₃) and in which the said barium atom is linked directly to the said oxygen atoms.

11. A lubricating oil composition containing a 2,4-dialkyl phenol sulfide having the following formula:

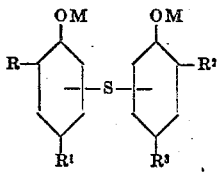

in which R, R¹, R² and R³ are alkyl radicals and the M's are jointly or singly barium, in amounts sufficient to exert sludge dispersing properties under heavy duty service without substantially increasing bearing corrosion.

12. An improved mineral oil composition comprising a mineral oil having admixed therewith a minor proportion of an oil miscible sulfide of an alkyl substituted aryl barium oxide in which the oxygen of the barium oxide group is directly attached to the aryl nucleus and in which at least two alkyl substituted aryl nuclei are interconnected by at least one atom of sulfur.

13. An improved mineral lubricating oil composition comprising a mineral lubricating oil having admixed therewith a minor proportion of an oil miscible barium salt of an alkylated phenol sulfide having the formula

in which the groups R, R', OH and $S_x$ are each connected to an aromatic nucleus (C₆H₃), R and R' represents alkyl groups (C$_n$H$_{2n+1}$) $n$ being at least 4 and $x$ represents an integer, 1 or 2.

14. A lubricant comprising a mineral lubricating oil and a small amount of an oil-soluble sulfide of a barium alkyl phenolate, in which a plurality of phenol groups are attached to a single barium atom.

15. An improved mineral lubricating oil composition comprising a mineral lubricating oil having admixed therewith a minor proportion of the barium salt of a tertiary amyl phenol sulfide.

16. An improved mineral lubricating oil composition comprising a mineral lubricating oil having admixed therewith a minor proportion of the barium salt of a tertiary octyl phenol sulfide.

17. A lubricating oil composition comprising a major amount of a hydrocarbon lubricating oil and a minor amount of the barium salt of an oil-soluble aliphatic substituted phenol sulfide, each aliphatic radical containing at least four aliphatic carbon atoms.

CARL WINNING.